United States Patent [19]

Moosberg et al.

[11] Patent Number: 4,580,742
[45] Date of Patent: Apr. 8, 1986

[54] MAGNETIC BRAKE FOR BRAKING THE LINE SPOOL OF A FISHING REEL

[75] Inventors: Börje S. Moosberg, Mörrum; Jarding U. Karlsson, Svängsta, both of Sweden

[73] Assignee: ABU Aktiebolag, Svangsta, Sweden

[21] Appl. No.: 499,970

[22] Filed: Jun. 1, 1983

[30] Foreign Application Priority Data

Jun. 11, 1982 [SE] Sweden .............................. 8203630

[51] Int. Cl.⁴ ............................................. A01K 89/02
[52] U.S. Cl. .................. 242/84.52 B; 310/93
[58] Field of Search ................ 242/84.52 B; 310/93, 310/105; 188/267

[56] References Cited

U.S. PATENT DOCUMENTS

| | | | |
|---|---|---|---|
| 2,314,032 | 3/1943 | Coxe et al. | 242/84.51 R |
| 2,482,428 | 9/1949 | Miler | 310/93 X |
| 2,517,926 | 8/1950 | Ransom | 242/84.52 B |

FOREIGN PATENT DOCUMENTS

| | | | |
|---|---|---|---|
| 214801 | 1/1958 | Australia | 242/84.52 B |
| 448537 | 5/1948 | Canada | 242/84.52 B |
| 56-175075 | 12/1981 | Japan | 242/84.52 B |
| 635116 | 4/1950 | United Kingdom | 242/84.52 B |
| 2092872 | 8/1982 | United Kingdom | 242/84.52 B |

*Primary Examiner*—Stuart S. Levy
*Assistant Examiner*—Katherine Matecki
*Attorney, Agent, or Firm*—Sheridan Neimark; Karl W. Flocks; A. Fred Starobin

[57] ABSTRACT

An induction-type magnetic brake for braking the line of a fishing reel during casting is disclosed, in which a number of permanent magnets are supported by an annular support which is carried in a coaxial position relative to the axis of rotation of the line spool near the outer side of one end wall of the line spool, and in which each permanent magnet is supported by the annular support such that one pole face of the magnet faces the spool end wall, the distance between the pole face and the end wall being adjustable by axial adjustment of the permanent magnet by means of a knob readily accessible on the outer side of the fishing reel.

4 Claims, 4 Drawing Figures

MAGNETIC BRAKE FOR BRAKING THE LINE SPOOL OF A FISHING REEL

This invention relates to a magnetic brake for inductive braking of the line spool of a fishing reel.

Magnetic brakes of this type are used for braking the line spool during casting, thereby to prevent rotation of the line spool at a speed higher than the reeling-out speed of the line, which usually results in backlash and over-running of the spool with consequent tangling of the line.

Prior art magnetic brakes comprise permanent magnets which are stationarily mounted outside the line spool but are grouped around the extension of the axis of rotation of the line spool and which brake the line spool by magnetic induction in a part (rotor) rotatable together with the spool spindle.

The present invention aims at simplifying and making the construction of prior art inductively operating line spool brakes more efficient. More particularly, the invention aims at providing a line spool brake which requires but little space, which permits the use of a relatively large number of permanent magnets, which operates efficiently in close conjunction to one spool end wall, which is readily adjusted to give the desired braking effect, and which comprises a minimum number of component parts.

These objects of the invention are achieved in that the magnetic brake according to the invention has been given the characteristic features stated in claim 1 and, for preferred embodiments, the characteristic features stated in claims 2 and 3.

The invention will be described in more detail in the following, reference being had to the accompanying drawings in which.

Figure 2:
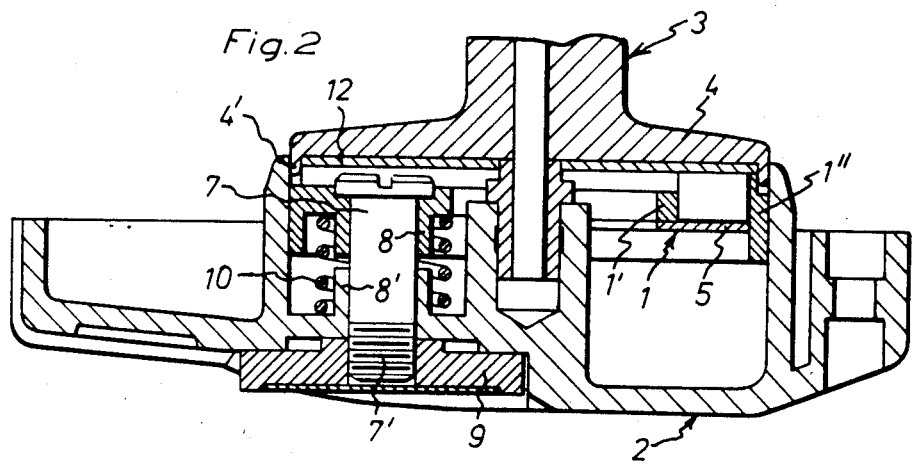
FIG. 2 is a fragmentary section of the fishing reel, taken along line II—II in FIG. 1.
Figure 3:
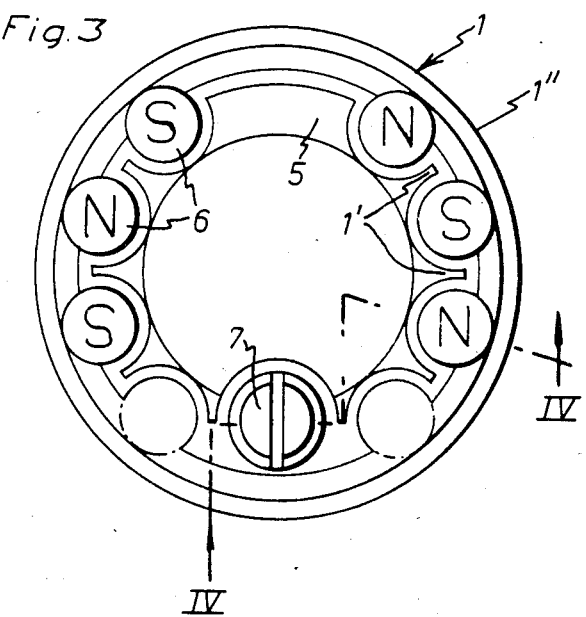
FIG. 3 is a plan view of the magnet support, showing the magnets mounted in position.

The magnetic brake according to the invention, in the embodiment illustrated in the drawings, comprises an annular magnet support which is generally designated 1 and detachably mounted in a circular hollow space which is provided in one end wall 2 of the fishing reel and which is open towards one end wall 4 of the line spool 3. Disposed in the annular support 1 is an annular plate 5 which constitutes a planar bottom plate for a plurality of small cylindrical permanent magnets 6. As will appear from FIGS. 3 and 4, the support has a radially inner ring-shaped wall 1' having a number of circular pockets with segmental walls for partially enclosing the cylindrical permanent magnets 6 and the head of a threaded bolt 7 which has a cylindrical shank portion extending through a sleeve-shaped portion 8 of the support 1 and is displaceably mounted in a sleeve-shaped portion 8' of the outer end wall 2, on the outer side of which the bolt 7, on a threaded end portion 7', carries an adjusting knob 9. As shown in FIG. 2, the bolt 7 and the support 1 are spring-loaded in a direction inwardly towards the line spool 3, 4 by means of a helical spring 10 inserted between the support 1 and the outer end wall 2. The bolt preferably is secured to the support 1 by friction or in some other manner and is displaceable relative to the sleeve-shaped portion 8'. The adjusting knob 9 which is mounted on the threaded portion of the bolt 7, has an inner flange engaging a planar supporting surface of the outer end wall 2. By turning the knob in one direction, the magnet support 1 can be moved away from the end wall 4 of the line spool 3, and by turning the knob in the opposite direction, the support is returned by the spring towards the line spool. At all times, the support 1 remains essentially parallel to the outer end wall 4. In this manner, the gap 12 between the ends of the permanent magnets 6 and the spool end wall 4, and thus the magnetic force, can be varied while the magnets 6 axially moved in relation to the end wall 4.

Figure 4:
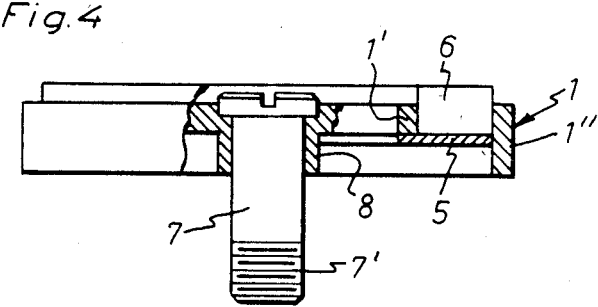
FIG. 4 is a side view of the magnet support which is shown partly in section along line IV—IV in FIG. 3.

As is shown in FIG. 4, the small cylindrical magnets 6 are so positioned that every other magnet has its north pole end and every other magnet has its south pole end facing the line spool. According to need, two magnets may be inserted or dispensed with, as is indicated by the dash and dot lines in FIG. 3. Thus, it is possible to use in a magnet support ring a desired number of magnets for different types and sizes of fishing reels, depending on the braking power which is required for braking line spools of different weights.

Figure 1:
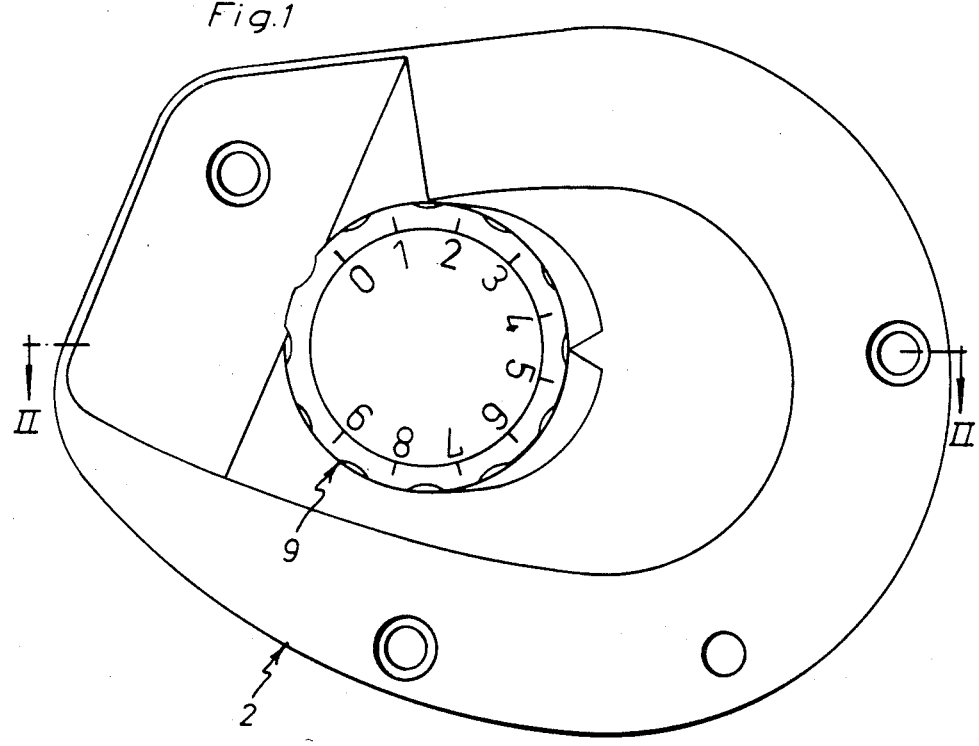
FIG. 1 shows a stationary outer end wall of the fishing reel, with the adjusting knob for the magnetic brake.

That part of the outer end wall of the fishing reel which is designated 2 in FIG. 1 may be in the form of a detachable cap, and the magnet support ring 1 which preferably is made of plastic, is displaceably guided on the inner side of the cap. The end wall 4 may be made of metal, such as aluminum, or metallised for magnetic inductive cooperation with the magnets. The bottom plate 5 may be made of sheet metal or other magnetic material. The magnets are supported on the plate by their rear ends, and the plate closes the magnetic circuit. If desired, the plastic ring may be formed such that the magnets can be pressed into position in the pockets within the ring where they can be retained by friction and elastic clamping. It is also conceivable to combine these practical methods of securing the magnets in the magnet support.

The bottom plate 5 in the support 1 can engage a shoulder on the outer annular wall 1'' of the support and can either be glued to the plastic ring or be detachable therefrom. As has been mentioned before, the bottom plate 5 should consist of a metal establishing a magnetic connection between the north and south poles of the magnets, but the bottom plate 5 may also be a plastic plate which for instance, or preferably, is made integral with the plastic ring, in which case the surface of the bottom plate in contact with the magnets should be metallised or carry a magnetically conductive metal disc.

The adjusting device is extremely simple in that it comprises but three independently dismountable components: the bolt, the adjusting knob and the spring. Mounting of the bolt only requires a cylindrical bearing surface on the bolt and a corresponding bearing surface in the sleeve-shaped portion of the cap 2 connected to the fishing reel.

In the magnetic brake according to the invention, the braking effect is controlled by axial adjustment of the distance of the magnets from the adjacent side of one end wall 4 of the line spool 3. In this manner, the total end area of the magnet poles and the maximum circumference of the line spool end wall 4 can be utilised. The air gap between the magnet poles and the line spool end wall 4 can be adjusted from a minimum which merely requires the line spool to go free from mechanical contact with the magnetic brake, to a maximum at which the brake effect of the magnets by magnetic induction in the line spool end wall 4 is substantially zero. The air gap or clearance can be reduced by means of a flange 4' on the outer circumference of the end wall 4.

The adjustment of the magnetic brake can be registered by means of an index marking from 0 to 9 on the adjusting knob and an index point on the end wall cap 2. By providing, for example, a pin and a spring as well as a number of recesses in the cap, a series of stop locations 0, 1, 2 . . . 10 can be established and sensed.

As is evident from the above description, the brake according to the invention comprises but a few component parts: the magnet support, i.e. the plastic ring and the bottom plate which consists of a sheet metal ring, the adjusting knob and the adjusting bolt (two components) with bearing surfaces, the sleeve-shaped portion in the cap with its bearing surface for the bolt, the planar bearing surface on the cap for supporting the knob, and the simple cylindrical magnets which may be from five to eight in number.

A further advantage is that the magnetic brake according to the invention is readily dismantled. The quickest way of doing this, is to remove the cap which carries the entire brake. The magnet support is readily detached from the cap by unscrewing the knob from the bolt and removing the entire magnet support together with the bolt. This means that the magnetic brake can be mounted without difficulty also by unskilled workers during manufacture of the fishing reel, and that overhaul and maintenance can readily be carried out by the fisherman himself under field conditions.

The invention is not restricted to the embodiment described above but can be modified in different ways within the scope of the appended claims.

What we claim and desire to secure by Letters Patent is:

1. An induction-type magnetic brake for braking a line spool of a fishing reel during casting, said fishing reel having a frame and an outer and inner side, comprising a plurality of permanent magnets which are supported by the frame of the fishing reel for inductive cooperation with a part, comprising a radial outer surface of one end wall of the line spool, rotating together with the line spool, an annular magnet support plate parallel to said end wall, said annular magnet support plate supporting each of said plurality of magnets in a fixed radial and axial relationship to each other of said plurality of magnets, the axial distances between all of said magnets and a plane defined by said end wall being mutually equal, and being carried by a member, connected to the frame of the fishing reel, in a coaxial position relative to the axis of rotation of the line spool, at a short axial distance from the radial outer surface of said one end wall constituting said rotating part; each permanent magnet being supported by said magnet support plate such that one pole face of each of the magnets faces said spool end wall; a means for adjusting the distance between said pole face and said end wall by axially moving said magnet support plate while maintaining said magnet support plate essentially parallel to said outer surfaces of said end wall, whereby the axial distances between all of said magnets and said plane defined by said end wall remain mutually equal, said adjusting means being readily accessible on the outer side of the fishing reel.

2. A magnetic brake as claimed in claim 1, wherein the magnet support plate consists of a ring of non-magnetic material and an annular bottom plate of magnetically conductive material the magnets bearing against said annular bottom plate with their pole faces remote from the end wall of the line spool; the magnets are axially adjustable collectively in that the magnet support plate is axially adjustable by means of said adjusting means; and the magnet support plate has a number of pockets so shaped as to partially enclose and support the magnets bearing against the annular bottom plate.

3. A magnetic brake as claimed in claim 1, including means for displaceably guiding the magnet support plate on the inner side of a cylindrical wall of the member connected to the frame of the fishing reel and wherein said magnet support plate is axially adjustable by means of an adjusting device consisting of a bolt connected to the magnet support and rotably mounted in a sleeve-shaped portion of said member, and of an adjusting knob in the form of a nut mounted on a threaded portion of the bolt, said bolt being loaded by a pressure spring in such a direction that the spring tends to keep the adjusting knob engaged with a supporting surface on said member, whereby the magnet support plate is displaceable in opposite axial directions against, and respectively, under the action of said pressure spring by rotation of the knob in opposite directions.

4. A magnetic brake as claimed in claim 2, including means for displaceably guiding the magnet support plate on the inner side of a cylindrical wall of the member connected to the frame of the fishing reel and wherein said magnet support plate is axially adjustable by means of an adjusting device consisting of a bolt connected to the magnet support plate and rotatably mounted in a sleeve-shaped portion of said member, and of an adjusting knob in the form of a nut mounted on a threaded portion of the bolt, said bolt being loaded by a pressure spring in such a direction that the spring tends to keep the adjusting knob engaged with a supporting surface on said member, whereby the magnet support plate is displaceable in opposite axial directions against, and respectively, under the action of said pressure spring by rotation of the knob in opposite directions.

* * * * *